(12) United States Patent
Singh et al.

(10) Patent No.: US 10,260,460 B2
(45) Date of Patent: Apr. 16, 2019

(54) FEEDBACK CONTROL OF FUEL REFORMER-ENGINE SYSTEM

(71) Applicant: CATERPILLAR Inc., Peoria, IL (US)

(72) Inventors: Jaswinder Singh, Dunlap, IL (US); David Ginter, Commerce Township, MI (US); Martin L. Willi, Dunlap, IL (US); Joel D. Hiltner, Bellingham, WA (US)

(73) Assignee: Caterpillar Inc., Deerfield, IL (US)

( * ) Notice: Subject to any disclaimer, the term of this patent is extended or adjusted under 35 U.S.C. 154(b) by 816 days.

(21) Appl. No.: 14/948,041

(22) Filed: Nov. 20, 2015

(65) Prior Publication Data

US 2017/0145965 A1    May 25, 2017

(51) Int. Cl.
| | |
|---|---|
| *F02M 25/12* | (2006.01) |
| *F01N 13/00* | (2010.01) |
| *F01N 13/08* | (2010.01) |
| *F02B 43/08* | (2006.01) |
| *F01N 9/00* | (2006.01) |

(52) U.S. Cl.
CPC ............. *F02M 25/12* (2013.01); *F01N 9/00* (2013.01); *F01N 13/008* (2013.01); *F01N 13/082* (2013.01); *F02B 43/08* (2013.01); *F01N 2240/30* (2013.01); *F01N 2560/026* (2013.01); *F01N 2610/06* (2013.01); *F01N 2900/08* (2013.01); *F01N 2900/1402* (2013.01); *Y02T 10/121* (2013.01); *Y02T 10/47* (2013.01)

(58) Field of Classification Search
CPC ............. F02M 25/12; F02M 21/0227; F02D 41/1438; F02D 41/1444; F01N 13/008; F01N 13/082; F01N 2900/08; F01N 2900/1402
See application file for complete search history.

(56) References Cited

U.S. PATENT DOCUMENTS

| | | | |
|---|---|---|---|
| 6,758,035 B2 | 7/2004 | Smaling | |
| 6,964,156 B2 | 11/2005 | Liu et al. | |
| 6,997,142 B2 * | 2/2006 | Wakao | F02M 23/10 123/3 |
| 7,802,434 B2 | 9/2010 | Varatharajan et al. | |
| 8,607,743 B2 | 12/2013 | Yahagi | |
| 2004/0099226 A1 * | 5/2004 | Bromberg | B01J 19/0006 123/3 |

(Continued)

*Primary Examiner* — Grant Moubry
(74) *Attorney, Agent, or Firm* — Finnegan, Henderson, Farabow, Garrett & Dunner, LLP

(57) ABSTRACT

A system for reforming a fuel may include a first sensor configured to measure an operating parameter of an engine. The operating parameter may correlate to a $NO_x$ emission level of the engine. The system may also include a controller in communication with the sensor and a reformer. The controller may be configured to determine a target $NO_x$ emission level for the engine. The controller may be also configured to determine a target value of the operating parameter corresponding to the target $NO_x$ emission level. The controller may be further configured to control the reformer to reform at least a portion of the fuel based on a difference between the measured value and the target value of the operating parameter.

20 Claims, 4 Drawing Sheets

(56) References Cited

U.S. PATENT DOCUMENTS

2010/0300110 A1   12/2010   Kraemer et al.
2011/0296844 A1   12/2011   Widener et al.
2014/0109844 A1    4/2014   Wall et al.
2014/0109853 A1*  4/2014   Gruber .................. F02M 25/12
                                                              123/1 A

* cited by examiner

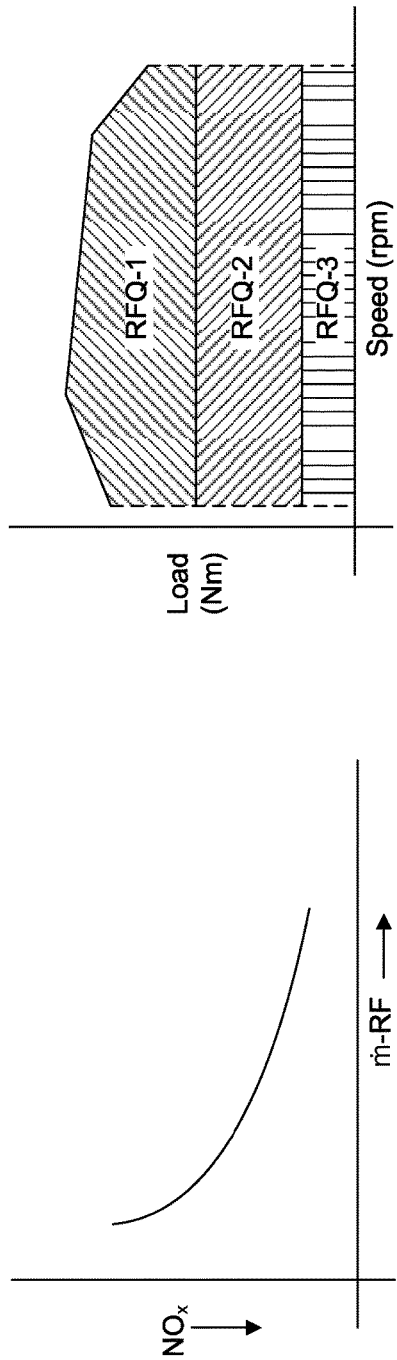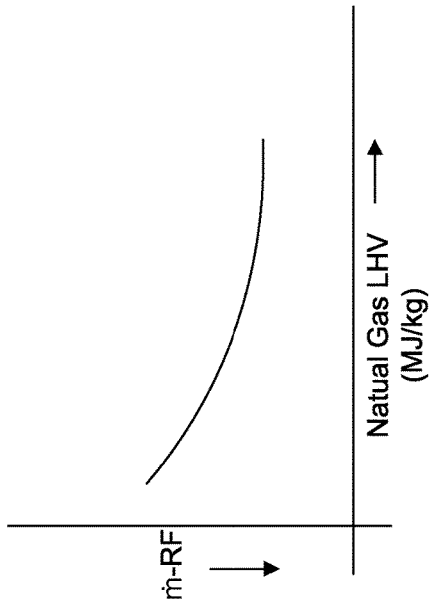
FIG. 3B
FIG. 3A
FIG. 3C

… (1) …

FEEDBACK CONTROL OF FUEL REFORMER-ENGINE SYSTEM

TECHNICAL FIELD

The present disclosure relates generally to feedback control of a fuel reformer and, more particularly, to a system and method for controlling a fuel reformer based on NO emission and performance of an engine.

BACKGROUND

Internal combustion engines may be configured to combust hydrocarbon fuel to produce power. However, combustion of hydrocarbon fuel produces undesirable pollutants, such as nitrogen oxide and nitrogen dioxide, collectively referred to as $NO_x$. Various environmental regulations have resulted in a need to significantly reduce the levels of pollutants without restricting the performance of an engine. One method of reducing the $NO_x$ emission is using lean burn technology. Generally, with a leaner mixture of air and fuel (i.e., a mixture having a relatively low amount of fuel compared to the amount of air), an engine may produce less $NO_x$ emission. Unfortunately, some fuels, such as natural gas, may experience unstable combustion at lean air-to-fuel ratios, due to the increased coefficient of variation (COV) of the indicated mean effective pressure (IMEP) and the increased risk of engine misfire. For example, excessive lean mixture in the vicinity of a spark plug at the time of spark discharge increases the risk of misfire, resulting in increased exhaust emissions and decreased thermal efficiency. Therefore, such combustion instability may prevent the lean burn technology from being used to reduce the $NO_x$ emissions to a satisfaction level.

To improve the combustion stability under lean burn conditions, the hydrocarbon fuel may be enriched with hydrogen ($H_2$). For example, a reformer may be used to reform at least part of the fuel into a synthesis gas (syngas), mainly including $H_2$ and carbon monoxide (CO). The syngas is then mixed with the air and unreformed fuel to form a $H_2$-rich mixture, which has improved ignition properties and therefore may help reduce the $NO_x$ emissions. The amount of syngas required to meet low $NO_x$ emissions may depend on the fuel quality and engine operating conditions. Accordingly, accurate sensing and control of the composition of the fuel and of operating characteristics of the engine enables improved engine performance and reduced production of pollutants.

Traditionally, the reformer and the engine are operated as independent entities. A controller of the engine determines the required amount of syngas as a function of the $NO_x$ emission target of the engine, and sends signals to the reformer requesting the determined amount of syngas. The reformer then independently tries to generate the requested amount of syngas. However, such a rigid control scheme does not work well under changing fuel qualities and engine operating conditions. For example, as the fuel quality changes, the performance and the $NO_x$ emissions of the engine may deteriorate even if the reformer is generating the requested amount of syngas.

One attempt to address the above-described problems is disclosed in Patent Application Publication No. 2011/0296844 (the '844 publication) by Widener et al., published on Dec. 8, 2011. In particular, the '844 publication discloses a gas turbine engine system utilizing a non-catalytic fuel reformer to partially oxidize a portion of the fuel stream feeding the gas turbine. The reformer improves combustion performance, such as flame stability and emissions, by doping the fuel with small amounts of hydrogen and/or carbon monoxide. The reformer is in operative communication with an engine control system. The engine control system employs various sensors to monitor the reactivity of the fuel and conditions within the gas turbine system, such as ambient temperature, humidity, exhaust backpressure, exhaust emissions, etc. The engine control system is configured to regulate fuel flow to the reformer and control the percentage of fuel reformed based on the monitored parameters. When certain parameters reach a predetermined target, the engine control system may alter the portion of the fuel being reformed or even momentarily cease reforming altogether.

Although the system described in the '844 publication may be useful in providing the amount of syngas required to meet a $NO_x$ emission target, it may be less than optimal. For example, the system does not enable a close correlation between the control of the reformer and the $NO_x$ emissions of the gas turbine. Therefore, the system may not readily meet the desired $NO_x$ emission level under changing fuel qualities and gas turbine conditions. Moreover, the system relies on a determination of both the fuel qualities and the gas turbine conditions. This not only adds to the complexity of the control scheme, but also results in relatively slow system response times dependent upon measurement of different characteristics of the fuel and the gas turbine. The speed of the system may preclude its use in highly-transient applications (for example, in combustion engine applications). In addition, the gas turbine is fundamentally different from a reciprocating internal combustion engine. For example, the combustion dynamics in a gas turbine are mostly constant, whereas the in-cylinder pressure in a reciprocating engine varies through different strokes of the engine, which make it more difficult to coordinate the operations of the reformer and the reciprocating engine.

The disclosed system is directed to overcoming one or more of the problems set forth above and/or other problems existing in the art.

SUMMARY

In one aspect, the present disclosure is directed to a system for reforming a fuel. The system may include a first sensor configured to measure an operating parameter of an engine. The operating parameter may correlate to a $NO_x$ emission level of the engine. The system may also include a controller in communication with the sensor and a reformer. The controller may be configured to determine a target $NO_x$ emission level for the engine. The controller may be also configured to determine a target value of the operating parameter corresponding to the target $NO_x$ emission level. The controller may be further configured to control the reformer to reform at least a portion of the fuel based on a difference between the measured value and the target value of the operating parameter.

In another aspect, the present disclosure is related to a method for reforming a fuel. The method may include measuring, by a first sensor, an operating parameter of an engine. The operating parameter may correlate to a $NO_x$ emission level of the engine. The method may also include determining, by a controller, a target $NO_x$ emission level for the engine. The method may further include determining, by the controller, a target value of the operating parameter corresponding to the target $NO_x$ emission level. The method may further include controlling, by the controller, a reformer to reform at least a portion of the fuel based on a difference between the measured value and the target value of the operating parameter.

In another aspect, the present disclosure is directed to a controller for reforming a fuel. The controller may include a memory storing instructions. The controller may also include a processor configured to execute the instructions to receive an operating parameter of an engine. The operating parameter may correlate to a $NO_x$ emission level of the engine. The processor may be also configured to execute the instructions to determine a target $NO_x$ emission level for the engine. The processor may be further configured to execute the instructions to determine a target value of the operating parameter corresponding to the target $NO_x$ emission level. The processor may be further configured to execute the instructions to control a reformer to reform at least a portion of the fuel based on a difference between the measured value and the target value of the operating parameter.

BRIEF DESCRIPTION OF THE DRAWINGS

FIGS. 3A-3C are three schematic graphs illustrating exemplary control schemes that may be implemented by the system of FIG. 2.

DETAILED DESCRIPTION

Figure 1:
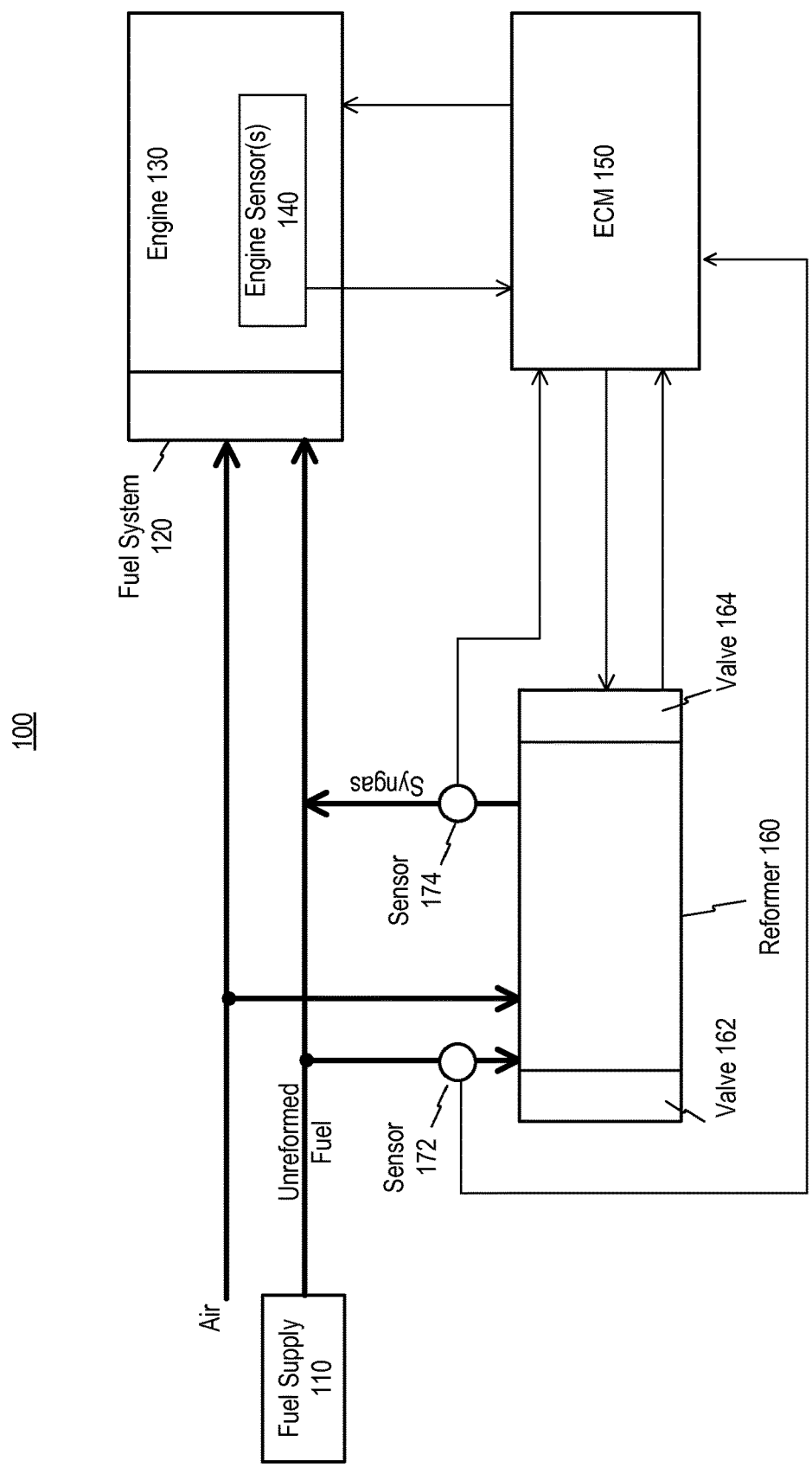
FIG. 1 is a diagrammatic illustration of an exemplary disclosed system for controlling a reformer.

FIG. 1 illustrates an exemplary system 100 for controlling a reformer to reform a fuel for an engine. By implementing feedback control of the reformer based on $NO_x$ emissions and performance of the engine, the system 100 may produce an appropriate amount of reformed fuel for reducing the $NO_x$ emissions of the engine. Referring to FIG. 1, the system 100 may include one or more of the following components: a fuel supply 110, a fuel system 120, an engine 130, one or more engine sensors 140, an engine control module (ECM) 150, a reformer 160, valves 162 and 164, a fuel quality sensor 172, and a reformate quality sensor 174. In FIG. 1, the fuel and air flows are depicted by the thicker arrows, and the signal and data flows are depicted by the thinner arrows.

The fuel supply 100 may be configured to supply a combustible fuel used by the engine 130 to produce power. An exemplary fuel may include natural gas. However, other types of fuel, such as landfill gas or digester gas, may be used as well. Moreover, the fuel may be a mixture of natural gas, landfill gas, digester gas, propane, bio-gas, $H_2$, and/or another fuel. Due to the diversification of fuel sources, the quality and/or composition of the fuel may change frequently.

Referring to FIG. 1, in exemplary operations, the air and fuel may be delivered to the engine 130, and mixed into a lean air-fuel mixture by the fuel system 120 before being ignited by a spark plug. To improve the thermal efficiency and combustion stability of the lean air-fuel mixture, the fuel may be enriched with $H_2$ before being mixed with the air. As shown in FIG. 1, at least a portion of the fuel from the fuel supply 110, together with air, may be diverted to the reformer 160. The reformer 160 may be configured to reform the diverted fuel to produce $H_2$ enriched fuel using any method known in the art, such as partial oxidation, steam reforming, etc. For example, the reformer 160 may include a suitable catalyst for performing a catalytic partial oxidation ($CPO_x$) process. The reformer 160 may perform the $CPO_x$ process to reform the diverted fuel to a $H_2$-rich gas, i.e., a syngas mainly comprising $H_2$, CO, $CO_2$, and $H_2O$. The syngas may then be mixed with the rest of the unreformed fuel and supplied to engine 130.

In exemplary embodiments, as shown in FIG. 1, the reformer 160 may be controlled by the ECM 150, which also controls the engine 130. However, it is contemplated that the engine 130 and reformer 160 may also be controlled by separate controllers. The ECM 150 may closely monitor the reformation process by using a plurality of temperature sensors and pressure sensors disposed inside the reaction chamber of the reformer 160. The ECM 150 may use signals received from these sensors to determine the temperature rise and the pressure drop from the inlet to the outlet of the reformer 160. The ECM 150 may adjust the temperature rise to control the quality of the syngas (for example, the $H_2$ concentration of the syngas). The ECM 150 may also adjust the pressure drop to control the flow rate in the reformer 160 and, thus, the reaction time of the fuel.

The valves 162 and 164 may be provided at the inlet and outlet of the reformer 160 respectively to control the flow of the fuel into and out of the reformer 160. The ECM 150 may provide signals to actuate the valves 162 and 164 to precisely control the flow rate of the fuel. Moreover, a fuel quality sensor 172 may be positioned upstream of the inlet of the reformer 160 and be configured to measure the quality of the unreformed fuel. Likewise, a reformate quality sensor 174 may be positioned downstream of the outlet of the reformer 160 to measure the quality of the syngas generated by the reformer 160. The sensors 172 and 174 may be configured to generate signals corresponding to the fuel qualities using any method known in the art. The signals generated by the sensors 172 and 174 may be sent to the ECM 150 for further processing. For example, the sensors 172 and 174 may be configured to sense a viscosity and/or a thermal property of the fuel, which may then be analyzed by the ECM 150 to determine the heating value and/or compositions of the fuel.

The ECM 150 may be configured to control the reformer 160 based on the qualities of the unreformed fuel and the generated syngas, detected respectively by the fuel quality sensor 172 and the reformate quality sensor 174. For example, as compared to reforming pure natural gas, the ECM 150 may set the temperature and pressure in the reformer 160 differently to reform a fuel that contains not only natural gas but also propane and butane. Also for example, depending on the $H_2$ concentration in the unreformed fuel, the ECM 150 may determine how much additional $H_2$ needs to be generated to meet a $NO_x$ emission target. The ECM 150 may then control the reaction condition in the reformer 160 to generate the desired amount of $H_2$. For yet another example, the ECM 150 may determine whether the syngas generated by the reformer 160 contains the desired amount of $H_2$. If not, the ECM 150 may control the reformer 160 to make adjustments to the $H_2$ concentration in the syngas.

The syngas generated by the reformer 160 may be mixed with the unreformed fuel and/or air before being injected into the engine 130. In the following description, the term "fuel," when used alone, may refer to a mixture of the unreformed fuel and the syngas.

The engine 130 may be, for example, a four-stroke reciprocating internal combustion engine that is controlled by the ECM 150. One skilled in the art will recognize, however, that the engine 130 may alternatively be a two-stroke engine, if desired. The engine 130 may include an engine block that at least partially defines one or more cylinders. A piston may be slidably disposed with each cylinder to reciprocate between a top-dead-center (TDC) position and bottom-dead-center (BDC) position, and a cylinder head may be associated with each cylinder. The cylinder, piston, and cylinder head may together define a combustion chamber. The engine 130 may include any number of combustion chambers disposed in an "in-line" configuration, in a "V" configuration, in an opposing-piston configuration, or in any other suitable configuration.

The engine 130 may include a crankshaft that is rotatably disposed within an engine block. A connecting rod may connect each piston to a throw of the crankshaft so that a sliding motion of the piston between the TDC and BDC positions within each respective cylinder results in a rotation of crankshaft. Similarly, a rotation of the crankshaft may results in a sliding motion of each piston between the TDC and BDC positions. In a four-stroke engine, the piston may reciprocate between the TDC and BDC positions through an intake stroke, a compression stroke, a combustion or power stroke, and an exhaust stroke. In a two-stroke engine, a complete cycle may include a compression/exhaust stroke (BDC to TDC) and a power/exhaust/intake stroke (TDC to BDC). The cylinder head may define an intake passageway and an exhaust passageway. The intake passageway may direct compressed air or an air and fuel mixture from an intake manifold, through an intake opening, and into each combustion chamber. The exhaust passageway may similarly direct exhaust gases from the combustion chamber through an exhaust opening and into an exhaust manifold. An intake valve may be disposed within an intake opening and configured to selectively engage a corresponding seat. Each intake valve may be movable between a first position, at which the intake valve engages the seat and inhibits a flow of fluid relative to the intake opening, and a second position, at which the intake valve is removed from the seat to allow the flow of fluid. An exhaust valve may be similarly disposed within an exhaust opening and configured to selectively engage a corresponding seat. Each exhaust valve may be movable between a first position, at which the exhaust valve engages the seat to inhibit a flow of fluid relative to the exhaust opening, and a second position, at which the exhaust valve is removed from the seat to allow the flow of fluid.

A series of valve actuation assemblies (not shown) may be operatively associated with the engine 130 to move the intake and exhaust valves between the first and second positions at desired timings relative to the rotation of the crankshaft and/or the position of each piston. Each cylinder head may include multiple intake openings and multiple exhaust openings. Each such opening may be associated with either an intake valve or an exhaust valve. The engine 130 may include a valve actuation assembly for each cylinder head that is configured to actuate all of the intake valves or all of the exhaust valves of that cylinder head. A single valve actuation assembly could actuate the intake valves or the exhaust valves associated with multiple cylinder heads, if desired. The valve actuation assemblies may each embody, for example, a cam/push-rod/rocker arm arrangement, a solenoid actuator, a hydraulic actuator, and/or any other means for actuating known in the art. The timing at which the intake and/or exhaust valves are opened and/or closed may have an effect on engine operation (e.g., an effect on in-cylinder pressure, temperature, efficiency, detonation timing, etc.), and may be variably controlled by the ECM 150 in some embodiments in accordance with the qualities of the unreformed fuel and syngas detected by the sensors 172 and 174, respectively.

The fuel system 120 shown in FIG. 1 may embody, for example, a fuel mixing valve, a fuel inlet valve, a fuel injector, a carburetor, etc., situated in communication with the intake passageway. The fuel system 120 may be powered electronically, hydraulically, mechanically, and/or pneumatically to provide pressurized fuel directly into each combustion chamber or indirectly via the intake passageway or a fuel rail system, as desired.

The amount of fuel allowed into the intake passageway and/or the timing at which the fuel is allowed into the intake passageway by the fuel system 120 may be associated with an air-to-fuel ratio introduced into each combustion chamber. Specifically, if it is desired to introduce a lean mixture of air and fuel into a combustion chamber, the fuel system 120 may cause fuel to be directed into the intake passageway (and/or the combustion chamber) for a shorter period of time (or otherwise be controlled to inject less fuel per given cycle) than if a rich mixture of air and fuel (i.e., a mixture having a relatively large amount of fuel compared to the amount of air) is desired. Likewise, if a rich mixture of air and fuel is desired, the fuel system 120 may cause fuel to be directed into the intake passageway (and/or the combustion chamber) for a longer period of time (or otherwise be controlled to inject more fuel per given cycle) than if a lean mixture is desired.

To achieve a low $NO_x$ emission by the engine 130, a lean mixture of air and fuel may be used in the combustion chamber. In some embodiments, to assist in combustion in the combustion chamber, the engine 130 may include a combustion prechamber and the fuel system 120 may be configured to deliver a small quality of the fuel, i.e., the mixture of the unreformed fuel and the syngas, to the combustion prechamber. The fuel in the combustion prechamber may be ignited by a spark plug. The ignited fuel may then be delivered to the combustion chamber through a flame communication passageway. The ignited fuel may subsequently create combustion of the fuel in the combustion chamber.

Generally, the concentration of $H_2$ in the fuel determines the thermal efficiency and combustion stability of the lean mixture of air and fuel, and therefore may determine the $NO_x$ emission level of the engine 130. In exemplary embodiments, to produce the amount of $H_2$ necessary for maintaining a low $NO_x$ emission level, the ECM 150 may use a feedback mechanism to control the reformer 160 based on the real-time $NO_x$ emissions of the engine 130, which may be measured by one or more engine sensors 140 mounted on the engine 130.

The engine sensors 140 may be configured to measure one or more operating parameters of the engine 130. Such operating parameters may correlate to the $NO_x$ emission level of the engine 130 and provide feedback of the $NO_x$ emissions to the ECM 150. For example, the engine sensors 140 may include a pressure sensor disposed in each cylinder of the engine 130 (i.e., in the fluid contact of the respective combustion chamber) and configured to measure an in-cylinder pressure. The pressure sensor may be any suitable sensing device for sensing an in-cylinder pressure, such as a piezoelectric crystal sensor or a piezoresistive pressure sensor. The pressure sensor may measure a pressure within a cylinder during, for example, the compression stroke and/or the power stroke, and may generate a corresponding signal. The measured in-cylinder pressure may be indicative of the $NO_x$ production within the cylinder. By determining the $NO_x$ production within each cylinder, a total $NO_x$ production of the engine 130 may be determined.

The engine sensors 140 may also include a temperature sensor disposed at the head of each combustion chamber of the engine 130. For example, the temperature sensor may be a thermocouple and configured to measure an average temperature of the combustion process through the four strokes of a four-stroke engine or the two strokes of a two-stroke engine. Similar to the in-cylinder pressure, the average temperature in a combustion chamber may be indicative of the $NO_x$ production within the respective combustion chamber. For example, a rising temperature in a combustion chamber may indicate that the $NO_x$ production in the chamber is also rising, and a decreasing temperature may indicate the $NO_x$ production is also decreasing.

The engine sensors 140 may also include an ion sensor disposed in each combustion chamber of the engine 130. For example, the ion sensor may be a spark plug configured to measure a flame speed. After ignition, a high-voltage potential may be applied across the spark plug to cause the formation of an ion current. The subsequent change of the ion current may reflect the timing of the arrival of the burning flame front and the burning ionized gasses. This information may be used to deduce the flame speed, which is also indicative of the $NO_x$ production within the respective combustion chamber.

The engine sensors 140 may further include a $NO_x$ sensor attached to the tailpipe of the engine 130 and configured to directly measure the $NO_x$ concentration in the engine exhaust. Compared to the in-cylinder pressure, combustion chamber temperature, and the flame speed, the tailpipe $NO_x$ concentration may have a longer time delay from the actual operation point of the engine 130. However, such a delay usually is insignificant except in fast-transient operations. Moreover, even if the engine 130 performs fast-transient operations, other sensors, such as the above-described pressure sensor, temperature sensor, and ion sensor, may be used in conjunction with the $NO_x$ sensor to provide timely information regarding the engine operation.

The engine sensors 140 may be in wired or wireless communication with the ECM 150 and be configured to send the sensed signals to the ECM 150 for processing. The ECM 150 may pre-store a corresponding relationship between an engine operating parameter and a $NO_x$ emission level. For example, a $NO_x$ emission model as a function of one or more operating parameters may be deduced based on the calibration data of the engine. In the case of the in-cylinder pressure, historical data of in-cylinder pressure and the corresponding NOx emission level may be used to fit a correlation model. The ECM 150 may use this correlation model to determine the $NO_x$ emission level based on the in-cylinder pressure, and further determine whether the engine 130 is operating at the target $NO_x$ emission level.

To perform feedback control of the reformer 160, the ECM 150 may also use the pre-stored corresponding relationships to determine a target value of an operating parameter based on a target $NO_x$ emission level. The ECM 150 may continuously and automatically control the reformer 160 to meet the target value of the operating parameter. Specifically, the ECM 150 may calculate the difference between the measured value and the target value of the operating parameter. If the difference is above a predetermined threshold, the ECM 150 may adjust the operation of the reformer 160, such as the temperate, pressure, and flow rate in the reaction chamber of the reformer 160, to reduce the difference between the measured value and target value. The ECM 150 may iterate such compare-and-control processes until the difference is below the predetermined threshold. For example, the ECM 150 may determine a target value of the average temperature in a combustion chamber that corresponds to a target $NO_x$ emission level. If the measured temperature is higher than the target temperature, the ECM 150 may determine that the current $NO_x$ emission level is above the target $NO_x$ emission level. Accordingly, the ECM 150 may control the fuel system 120 to provide a leaner mixture of air and fuel for the engine 130 and control the reformer 160 to generate more syngas (i.e., to provide more $H_2$). The ECM 150 may continue to tune the air-to-fuel ratio and the amount of syngas until the difference between the measured temperature and the target temperature is reduced to an acceptable range. In contrast, if the measured temperature in the combustion chamber is lower than the target temperature, the ECM 150 may determine that the current $NO_x$ emission level is below the target emission level and there is no need to change the operation of the reformer 160. In some situation, to save energy, the ECM 150 may even control the reformer 160 to produce less syngas (i.e., $H_2$) and/or control the fuel system 120 to provide a richer mixture of air and fuel, so as to allow the temperature in the combustion chamber to rise, but not exceed the target temperature.

Similar to the average temperature in a combustion chamber, the ECM 150 may also use the in-cylinder pressure, flame speed, or tailpipe $NO_x$ concentration as a feedback of the engine 130 to control the reformer 160. For example, the ECM 150 may determine a target value of the flame speed based on the target $NO_x$ emission level. The ECM 150 may then tune the operation of the reformer 160 to increase or decrease the flame speed until it reaches the target value.

In exemplary embodiments, the ECM 150 may also control the reformer 160 based on performance of the engine 130, such as the power output and speed of the engine 130. For example, the engine sensors 140 may include a torque sensor configured to measure a torque output, and a speed sensor configured to measure an engine speed. After receiving the signals generated by the torque sensor and speed sensor, the ECM 150 may further determine the power output (i.e., load) of the engine 130. If the power output and/or speed of the engine 130 is increasing, the ECM 150 may control the reformer 160 to generate more syngas. In contrast, if the power output and/or speed of the engine 130 is decreasing, the ECM 150 may control the reformer 160 to generate less syngas.

As described above, both the engine 130 and the reformer 160 may be controlled by the ECM 150. This may simplify the hardware configuration used for tying the control of the reformer 160 to the emission and performance of the engine 130. The ECM 150 may embody a single processor or multiple processors that include a means for controlling operations of the engine 130 and the reformer 160. Numerous commercially available processors may perform the functions of the ECM 150. The ECM 150 may also include or be associated with a memory for storing instructions used by the processor to perform certain functions related to the disclosed embodiments. Moreover, the memory may store data such as, for example, corresponding relationships between various operating parameters and the $NO_x$ emission level of the engine 130, and performance characteristics or specifications of the engine 130 and the reformer 160. Various other known circuits may be associated with the ECM 150, including power supply circuitry, signal-conditioning circuitry, solenoid driver circuitry, communication circuitry, and other appropriate circuitry. Moreover, the ECM 150 may be capable of communicating with other components of the system 100, for example, the fuel system 120, the engine sensors 140, the valves 162 and 164, the fuel quality sensor 172, the reformate quality sensor 174, etc., via either wired or wireless transmission and, as such, the ECM 150 may be connected to or alternatively disposed in a location remote from the engine 130.

Figure 2:
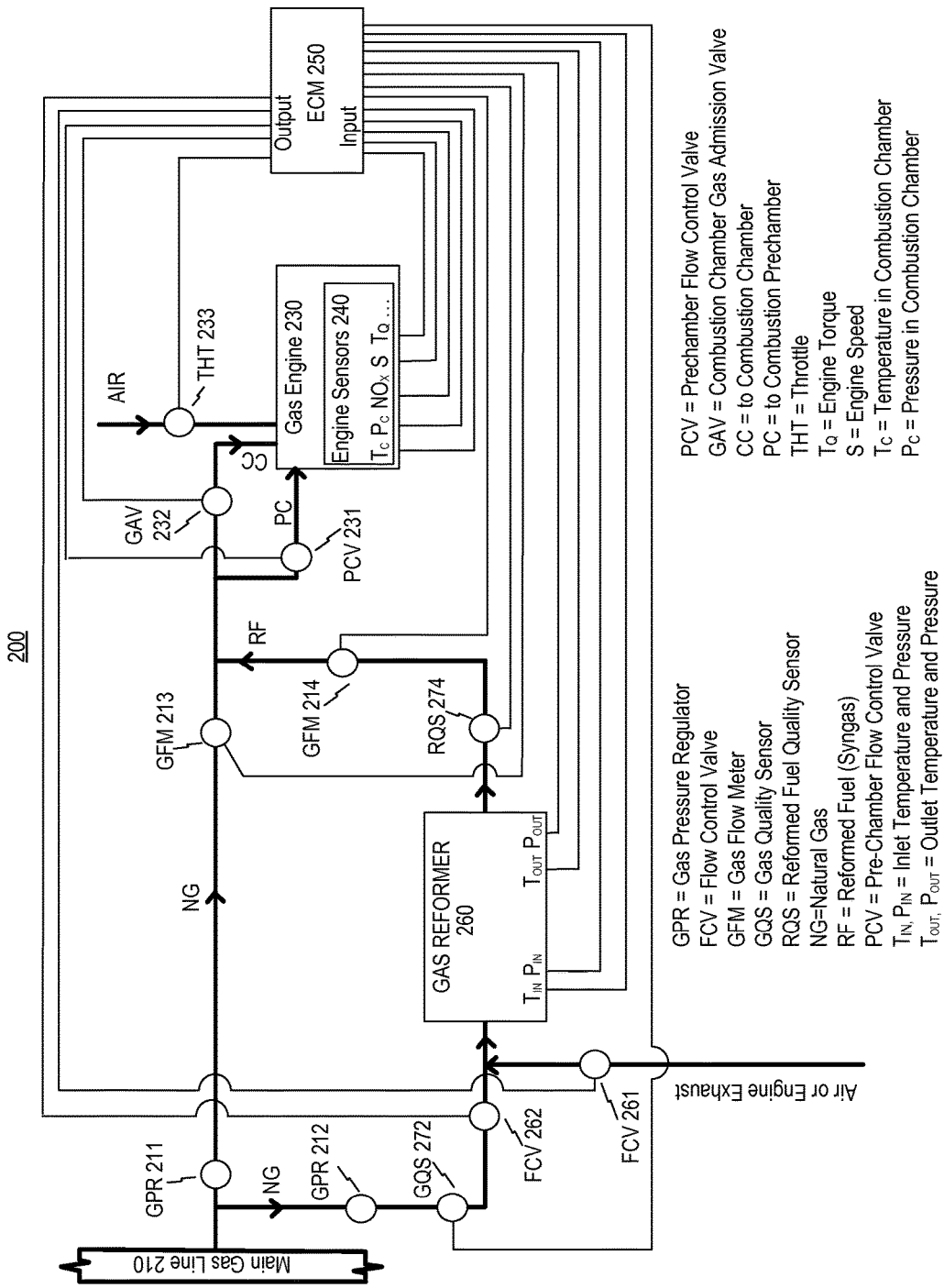
FIG. 2 is a detailed diagrammatic illustration of an exemplary disclosed reformer-engine system consistent with the system of FIG. 1.

FIG. 2 is a detailed diagrammatic illustration of a reformer-engine system 200, consistent with the system 100 (FIG. 1). The system 200 may include an internal combustion gas engine 230 running on natural gas, and a gas reformer 260 configured to reform the natural gas into syngas. The system 200 may also include an ECM 250 configured to control and coordinate the operations of the gas engine 230 and the gas reformer 260.

Referring to FIG. 2, the fuel and air pathways are depicted by the thicker lines. A main gas line 210 may supply the natural gas for the gas engine 230 and the gas reformer 260. Gas pressure regulators (GPR) 211 and 212 may regulate the pressure of natural gas flowing to the gas engine 230 and the gas reformer 260, respectively. A flow control valve (FCV) 262 may control the flow rate of the natural gas flowing into the gas reformer 260. Another FCV 261 may control the flow rate of the air or engine exhaust flowing into the gas reformer 260. The natural gas, air, and/or engine exhaust may then be mixed and reformed by the gas reformer 260 to produce a $H_2$-rich syngas. Gas quality sensor (GQS) 272 may be provided upstream of the gas reformer 260 to monitor the quality and/or composition of the natural gas, whereas reformed fuel quality sensor (RQS) 274 may be provided downstream of the gas reformer 260 to monitor the quality and or composition of the syngas. For example, the GQS 272 and RQS 274 may be configured to detect the $H_2$ concentrations in the natural gas and syngas, respectively. The difference between these two concentrations may be used by the ECM 250 to evaluate and control the reforming process. The syngas and natural gas are mixed into a fuel mixture to be supplied to the gas engine 230. Gas flow meters (GFM) 213 and 214 may be provided to monitor mass or volumetric flow rate of the natural gas and the syngas, respectively. These measured flow rates may be provided to the ECM 250 for controlling the desired percentage of syngas in the fuel mixture. A prechamber flow control valve (PCV) 231 may allow a small quantity of the fuel mixture to flow into a combustion prechamber of the gas engine 230, whereas a combustion chamber gas admission valve (GAV) 232 may allow the majority of the fuel mixture to flow into the combustion chambers of the gas engine 230. Meanwhile, throttle (THT) 233 may control the amount of air flowing into the combustion chamber, so as to form a desired lean air-fuel mixture.

Still referring to FIG. 2, the data and signal pathways are depicted by the thinner lines. The ECM 250 may receive input signals from various components of the system 200. These signals may indicate the real-time feedback from the gas engine 230 regarding the engine emissions and performance. For example, the ECM 250 may receive engine operating parameters measured by engine sensors 240, such as average temperature in the combustion chamber, in-cylinder pressure, flame speed, tailpipe $NO_x$ concentration, etc. The ECM 250 may also receive engine performance parameters measured by the engine sensors 240, such as engine torque, engine speed, etc. Moreover, the ECM 250 may receive feedback from the gas reformer 260 regarding the performance of the reforming process. For example, the ECM 250 may receive signals indicative of the temperatures and pressures at various locations inside the gas reformer 260, so as to determine the temperature rise and pressure drop from the inlet to the outlet of the gas reformer 260. Furthermore, the ECM 250 may receive signals from the GQS 272 and RQS 274 that indicate the qualities and/or compositions of the natural gas and syngas. In addition, the ECM 250 may monitor the flow and mixture conditions of the natural gas and syngas by collecting signals from the GFMs 213 and 214.

With continued reference to FIG. 2, the ECM 250 may process the input signals and generate output signals to control the operations of the gas reformer 260 and the gas engine 230. For example, the ECM 250 may control the FCVs 262 and 263 to adjust the flow rates of the natural gas, air, and/or engine exhaust flowing into the gas reformer 260. This way, the ECM 250 may control the amount of syngas generated by the gas reformer 260. Also for example, the ECM 250 may control the PCV 231 to adjust the flow rate of the fuel mixture flowing into the combustion prechamber of the gas engine 230, and control the GAV 232 and the throttle to control the air-fuel ratio in the combustion chamber of the gas engine 230.

The ECM 250 may control the gas reformer 260 based on the $NO_x$ emissions of the gas engine 230, the performance of the gas engine 230, and/or the quality of the natural gas. FIGS. 3A-3C are three schematic graphs illustrating exemplary control schemes that may be implemented by the system 200. FIG. 3A illustrates an example of controlling the gas reformer 260 based on feedback regarding the $NO_x$ emissions of the gas engine 230. Referring to FIG. 3A, for a given engine power output, the $NO_x$ emission level of the gas engine 230 correlates to the amount of syngas (i.e., reformed fuel) supplied to the gas engine 230. Specifically, the desired air-fuel ratio in the combustion chamber is determined by the target $NO_x$ emission level. Each air-fuel ratio may require a corresponding percentage of syngas in the fuel mixture to maintain combustion stability at a specified operation point of the gas engine 230. Generally, the $NO_x$ emission level of the gas engine 230 may decrease as the mass flow rate of the syngas (indicated as rh-RF) increases. Therefore, based on feedback regarding the $NO_x$ emissions of the gas engine 230, the ECM 250 may control the gas reformer 260 to tune the flow rate of the syngas until the $NO_x$ emissions meet certain target.

FIG. 3B illustrates an example of controlling the gas reformer 260 based on feedback regarding the performance of the gas engine 230. Referring to FIG. 3B, for a given quality of the natural gas, the syngas quality (also known as reformed fuel quality or RFQ), such as the $H_2$ concentration in the syngas, desired to meet certain $NO_x$ emission level may vary depending on the performance of the gas engine 230. For example, when the engine load (measured by engine torque) and speed fall in different operating regions, the desired syngas quality may also change. Accordingly, based on the load and speed feedback, the ECM 250 may operate the gas reformer 230 differently by controlling the flow rates of the natural gas, air, and/or engine exhaust, which are supplied to the gas reformer 260.

FIG. 3C illustrates an example of controlling the gas reformer 260 based on both the engine feedback and the quality of the natural gas. Referring to FIG. 3C, under given $NO_x$ emission level and engine power output, as the lower heating value (LHV) of the natural gas increases or as the methane number (MN) of the natural gas decreases, the mass flow rate of the syngas (ṁ-RF) may need to be decreased to reduce the engine's overall propensity to knock. Accordingly, by monitoring the $NO_x$ emissions and performance of the gas engine 230 and the quality of the natural gas, the ECM 250 may control the gas reformer 260 to produce a proper amount of syngas.

INDUSTRIAL APPLICABILITY

Figure 4:
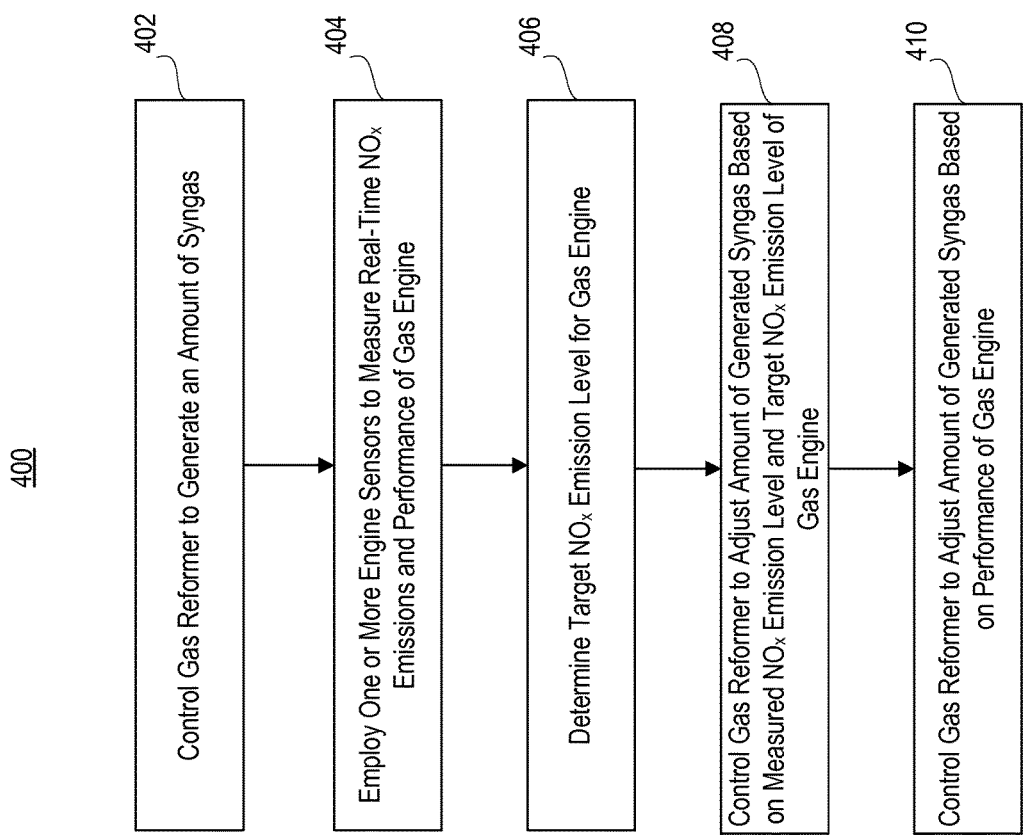
FIG. 4 is a flowchart depicting an exemplary disclosed method that may be performed by the system of FIG. 1.

The disclosed system may have industrial applicability in situations where low $NO_x$ emission is desired in a spark-ignited gas engine. The disclosed system employs a reformer to generate $H_2$-rich syngas for improving the thermal efficiency and combustion stability of a lean burn condition. The disclosed system further controls the reformer based on the emission and performance of the engine, to generate a precise amount of syngas required by the engine to meet a low $NO_x$ emission target. Operation of the disclosed system will now be described in connection with the flowchart of FIG. 4 by referring to the system 200.

In step 402, the ECM 250 may control the gas reformer 260 to generate an amount of syngas. By controlling the timing of opening and/or closing the FCV 262, the ECM 250 may divert a portion of the natural gas from the main gas line 210 to the gas reformer 260. The gas reformer 260 may run a reforming process, for example, a CPO process, to reform the diverted natural gas into syngas. The syngas is a mixture of $H_2$ and other gases. The ECM 250 may then direct the syngas to combine with the rest of the natural gas and the air to form a lean air-fuel mixture. With the addition of syngas, the lean air-fuel mixture may have improved combustion stability and can burn more rapidly than a lean air-fuel mixture without syngas. Such stable lean burn condition may ensure a low $NO_x$ emission of the gas engine 230.

In some embodiments, the GQS 272 may be provided to monitor the quality or $H_2$ concentration of the natural gas. From this, the ECM 250 may determine the amount of additional $H_2$ needed for achieving low $NO_x$ emissions. As the quality or $H_2$ concentration of the natural gas changes, the ECM 250 may adjust the operation of the gas reformer 260 accordingly to generate the proper amount of syngas.

In some embodiments, the RQS 274 may also be provided to monitor the quality or $H_2$ concentration of the syngas. From this, the ECM 250 may determine whether the generated syngas contains the proper amount of $H_2$ for achieving a low $NO_x$ emission. If not, the ECM 250 may control the gas reformer 260 to maintain a desired $H_2$ concentration in the syngas.

In step 404, the ECM 250 may employ one or more engine sensors 240 to measure the real-time $NO_x$ emissions and performance of the gas engine 230. The engine sensors 240 may be configured to measure one or more operating parameters of the gas engine 230 that correlate to the $NO_x$ emission level of the gas engine 230. Suitable engine sensors 240 may include, but not be limited to, a pressure sensor configured to measure an in-cylinder pressure of the gas engine 230, a temperature sensor configured to measure an average temperature of a combustion chamber, an ion sensor configured to determine a flame speed in a combustion chamber, and/or a $NO_x$ sensor configured to determine a $NO_x$ concentration in the engine exhaust. The operating parameters may indicate the current $NO_x$ emission level of the gas engine 230. For example, a rising temperature in a combustion chamber may indicate that the $NO_x$ production in the chamber is rising. In exemplary embodiments, different types of engine sensors 240 may be used in combination to measure the engine operating parameters. For example, the tailpipe $NO_x$ sensor may provide a direct measurement of the $NO_x$ emission level, but may have a noticeable lag time from the corresponding operation point of the gas engine 230. Accordingly, other types of sensors placed in other locations of the gas engine 230 may be used in conjunction with the $NO_x$ sensor to provide a complete picture about the $NO_x$ emission level of the gas engine 230 in real time.

The engine sensors 240 may also be configured to measure the performance of the gas engine 230, such as the power output and speed of the gas engine 230. For example, the engine sensors 240 may include, but not be limited to, a torque sensor configured to measure a torque generated by the gas engine 230, and a speed sensor configured to measure an engine speed. The performance of the gas engine 230 may indicate the amount of syngas needed for maintaining a low $NO_x$ emission level. For example, with higher power output and/or engine speed, the gas engine 230 may need to combust more syngas.

In step 406, the ECM 250 may determine a target $NO_x$ emission level for the gas engine 230. The target $NO_x$ emission level may be prescribed by environmental regulations or specifications of the gas engine 230. The target $NO_x$ emission level may also be input by an operator of the gas engine 230. In some embodiments, the ECM 250 may also dynamically assign a target $NO_x$ emission level based on the operations of the gas engine 230. For example, the ECM 250 may assign the target $NO_x$ emission level proportional to the load on the gas engine 230.

In step 408, the ECM 250 may control the gas reformer 260 to adjust the amount of generated syngas based on the measured $NO_x$ emission level and the target $NO_x$ emission level of the gas engine 230. The ECM 250 may store a corresponding relationship between an operating parameter and a $NO_x$ emission level of the gas engine 230. Based on the target $NO_x$ emission level determined in step 406, the ECM 250 may use the corresponding relationship to deduce a target value for the operating parameter. The ECM 250 may then determine the difference between the measured value and the target value of the operating parameter. If the difference exceeds a predetermined threshold, the ECM 250 may control the gas reformer 260 to adjust the composition (for example, the $H_2$ concentration) and the flow rate of the syngas. For example, if a measured temperature in a combustion chamber is higher than a target temperature corresponding to the target $NO_x$ emission level, the ECM 250 may control the gas reformer 260 to generate more syngas to satisfy the needs of the combustion. In contrast, if the measured temperature is below the target temperature, the ECM 250 may control the gas reformer 260 to maintain or reduce the current production level of syngas to save energy and/or to reduce the emission of harmful fuel gases. In exemplary embodiments, step 408 may be iterated until the difference between the measured value and the target value of the operating parameter is decreased below the predetermined threshold.

In step 410, the ECM 250 may further control the gas reformer 260 to adjust the amount of generated syngas based on the performance of the gas engine 230. The performance of the gas engine 230 may provide additional feedback for the ECM 250 to control the operation of the gas reformer 260. If the power output and/or speed of the gas engine 230 increases, the ECM 250 may control the gas reformer 260 to generate more syngas. And if the power output and/or speed of the gas engine 230 decreases, the ECM 250 may control the gas reformer 260 to generate less syngas. The ECM 250 may perform the steps 408 and 410 simultaneously to not only maintain the target $NO_x$ emission level of the gas engine 230, but also to satisfy the performance need of the gas engine 230. The combination of steps 408 and 410 may ensure the desired amount of syngas to be quickly reached.

The disclosed system may provide several benefits. First, by pegging the control of the reformer to the real-time $NO_x$ emission level and the performance of the engine, the system may perform fine tuning of the reformer to generate the precise amount of syngas needed for meeting a $NO_x$ emission target. For example, in one embodiment, the system may reduce the $NO_x$ emission to less than 0.16 g/bhp-h. Moreover, because the reformer is directly driven by changes in the engine, the system may quickly respond to the needs of the engine so as to constantly keep the $NO_x$ emission at or below the target level. Further, the system may meet the target $NO_x$ emission level under changing fuel qualities.

It will be apparent to those skilled in the art that various modifications and variations can be made to the system of the present disclosure. Other embodiments will be apparent to those skilled in the art from consideration of the specification and practice of the present disclosure. It is intended that the specification and examples be considered as exemplary only, with a true scope being indicated by the following claims and their equivalents.

What is claimed is:

1. A system for reforming a fuel, comprising:
  a first sensor configured to measure an operating parameter of an engine, the operating parameter correlating to a $NO_x$ emission level of the engine; and
  a controller in communication with the sensor and a reformer, the controller being configured to:
    determine a target $NO_x$ emission level for the engine;
    determine a target value of the operating parameter corresponding to the target $NO_x$ emission level; and
    control the reformer to reform at least a portion of the fuel based on a difference between the measured operating parameter and the target value of the operating parameter.

2. The system of claim 1, wherein the first sensor comprises at least one of:
  a pressure sensor configured to measure an in-cylinder pressure of the engine;
  a temperature sensor configured to measure an average temperature in a combustion chamber of the engine;
  an ion sensor configured to measure a flame speed of the engine; or
  a $NO_x$ sensor configured to measure a $NO_x$ concentration at a tailpipe of the engine.

3. The system of claim 1, wherein the controller is further configured to control the reformer to reform the fuel based on at least one of a power output or a speed of the engine.

4. The system of claim 1, wherein the controller is further configured to:
  control a composition of a reformed fuel; and
  control a flow rate of the reformed fuel.

5. The system of claim 1, further comprising:
  a second sensor configured to detect a composition of an unreformed fuel;
  wherein the controller is further configured to control the reformer based on the composition of the unreformed fuel.

6. The system of claim 1, further comprising:
  a third sensor configured to detect a composition of a reformed fuel;
  wherein the controller is further configured to control the reformer based on the composition of the reformed fuel.

7. The system of claim 1, wherein the controller is further configured to control the reformer to enrich the fuel with an amount of $H_2$.

8. The system of claim 1, wherein the fuel is natural gas.

9. The system of claim 1, wherein the engine is a reciprocating internal combustion engine.

10. A method for controlling the reforming of a fuel, comprising:
  measuring, by a first sensor, an operating parameter of an engine, the operating parameter correlating to a $NO_x$ emission level of the engine;
  determining, by a controller, a target $NO_x$ emission level for the engine;
  determining, by the controller, a target value of the operating parameter corresponding to the target $NO_x$ emission level; and
  controlling, by the controller, a reformer to reform at least a portion of the fuel based on a difference between the measured operating parameter and the target value of the operating parameter.

11. The method of claim 10, wherein the operating parameter of the engine comprises at least one of:
  an in-cylinder pressure of the engine;
  an average temperature in a combustion chamber of the engine;
  a flame speed of the engine; or
  a $NO_x$ concentration at a tailpipe of the engine.

12. The method of claim 10, further comprising:
  controlling, by the controller, the reformer to reform the fuel based on at least one of a power output or a speed of the engine.

13. The method of claim 10, wherein controlling the reformer to reform at least a portion of the fuel further comprises:
  controlling a composition of a reformed fuel; and
  controlling a flow rate of the reformed fuel.

14. The method of claim 10, further comprising:
  detecting, by a second sensor, a composition of an unreformed fuel; and
  controlling, by the controller, the reformer based on the composition of the unreformed fuel.

15. The method of claim 10, further comprising:
  detecting, by a third sensor, a composition of a reformed fuel; and
  controlling, by the controller, the reformer based on the composition of the reformed fuel.

16. The method of claim 10, wherein controlling the reformer to reform at least a portion of the fuel further comprises:
  controlling the reformer to enrich the fuel with an amount of $H_2$.

17. The method of claim 10, wherein the fuel is natural gas.

18. The method of claim 10, wherein the engine is a reciprocating internal combustion engine.

19. A controller for reforming a fuel, comprising:
  a memory storing instructions; and
  a processor configured to execute the instructions to:
    receive an operating parameter of an engine, the operating parameter correlating to a $NO_x$ emission level of the engine;
    determine a target $NO_x$ emission level for the engine;
    determine a target value of the operating parameter corresponding to the target $NO_x$ emission level; and
    control a reformer to reform at least a portion of the fuel based on a difference between the measured operating parameter and the target value of the operating parameter.

20. The controller of claim 19, wherein the operating parameter of the engine comprises at least one of:

an in-cylinder pressure of the engine;
an average temperature in a combustion chamber of the engine;
a flame speed of the engine; or
a $NO_x$ concentration at a tailpipe of the engine.

* * * * *